United States Patent [19]

Olsson et al.

[11] Patent Number: 4,969,446
[45] Date of Patent: Nov. 13, 1990

[54] DEVICE AT INTERNAL COMBUSTION ENGINES

[76] Inventors: John Olsson, Alfiskevagen 8 B, S 433 41, Partille; Bertil Olsson, Krondammsvagen 41, S-433 43 Partille; Gunnar Olssen, Fangdammsvagen 16, S 433-31 Partille, all of Sweden

[21] Appl. No.: 350,742
[22] PCT Filed: Oct. 19, 1987
[86] PCT No.: PCT/SE87/00477
§ 371 Date: Apr. 25, 1989
§ 102(e) Date: Apr. 25, 1989
[87] PCT Pub. No.: WO88/02815
PCT Pub. Date: Apr. 21, 1988

[30] Foreign Application Priority Data

Oct. 20, 1986 [SE] Sweden ................................. 8604448

[51] Int. Cl.$^5$ .................................................. F02M 23/00
[52] U.S. Cl. ...................................... 123/585; 123/432; 123/568; 123/25 A
[58] Field of Search ................ 123/585, 308, 432, 1 A, 123/568, 25 A, 531

[56] References Cited

U.S. PATENT DOCUMENTS

| | | | |
|---|---|---|---|
| 3,677,241 | 7/1972 | Gele et al. | 123/585 |
| 4,351,304 | 9/1982 | Schweizer | 123/585 |
| 4,361,126 | 11/1982 | Knapp et al. | 123/585 |
| 4,387,695 | 6/1983 | Hoppel et al. | 123/585 |
| 4,465,050 | 8/1984 | Igashira et al. | 123/585 |
| 4,566,634 | 1/1986 | Wiegand | 123/585 |
| 4,640,234 | 2/1987 | Olsson et al. | 123/308 |
| 4,714,063 | 12/1987 | Oda et al. | 123/432 |

Primary Examiner—Andrew M. Dolinar
Assistant Examiner—M. Macy
Attorney, Agent, or Firm—Ostrolenk, Faber, Gerb & Soffen

[57] ABSTRACT

An internal combustion engine includes: a combustion chamber with a suction opening; an inlet valve for closing the suction opening; a fluid supply line with an open end; and a gaseous medium supply line with an open end. The open end of the fluid supply line is in close proximity to the suction opening. The gaseous medium supply line surrounds a portion of the fluid supply line in the vicinity of the open end of the fluid supply line. The open end of the gaseous medium supply line is in close proximity to the open end of the fluid supply line. And the open end of the gaseous medium supply line is directed toward the suction opening of the combustion chamber. In operation, fluid is supplied through the fluid supply line in such small quantities that the fluid is in an almost pressure-free condition at the open end of the fluid supply line. The fluid is atomized by supplying a gaseous medium through the gaseous medium supply line and past the open end of the fluid supply line at a pressure which is different than the pressure prevailing outside of the open end of the gaseous medium supply line.

7 Claims, 2 Drawing Sheets

DEVICE AT INTERNAL COMBUSTION ENGINES

BACKGROUND OF THE INVENTION

1. Field of the Invention:

The present invention relates to an internal combustion engine.

Description of the Related Art:

DE-1,933,514-A1 discloses a fuel injection system for atomizing fuel. However, this system cannot be used to effectively supply fluid directly to the inlet opening of a combustion chamber. The continuously operating injection valve is so big that if it is arranged close to the inlet valve and if it is arranged so as to inject fluid in the desired direction, then it disturbs the air stream. The problems increase dramatically if the injection valve is surrounded by an additional mantle.

An alternative suggested in the German publication is to convey the atomized fluid in a tube, possibly provided with means for preheating. However, atomization is more difficult in this alternative, particularly if the fluid is water or alcohol.

The prior art has not been able to achieve continuous injection in close proximity to an inlet valve without disturbing the air flow, incorrectly aligning the atomizer or deteriorating the atomization.

Further, known continuous injection valves get stuck when run with water and/or alcohol. The known injection valves must be cleaned after each period of non-use that lasts for a period of hours.

Further, it is especially important that the fluid not be atomized too early. The fluid should be atomized just before it is sucked into the combustion chamber. But according to the German publication, admixing of the fuel and the air occurs on the way to the inlet opening.

SUMMARY OF THE INVENTION

An object of the present invention is to provide a very simple device for atomizing and injecting small quantities of liquid into a cylinder.

The present invention relates to an internal combustion engine which includes: a combustion chamber with a suction opening; an inlet valve for closing the suction opening; a fluid supply line with an open end; and a gaseous medium supply line with an open end. The open end of the fluid supply line is in close proximity to the suction opening. The gaseous medium supply line surrounds a portion of the fluid supply line in the vicinity of the open end of the fluid supply line. The open end of the gaseous medium supply line is in close proximity to the open end of the fluid supply line. And the open end of the gaseous medium supply line is directed toward the suction opening of the combustion chamber. In operation, fluid is supplied through the fluid supply line in such small quantities that the fluid is in an almost pressure-free condition at the open end of the fluid supply line. The fluid is atomized by supplying a gaseous medium through the gaseous medium supply line and past the open end of the fluid supply line at a pressure which is different than the pressure prevailing outside of the open end of the gaseous medium supply line.

DETAILED DESCRIPTION OF THE PREFERRED EMBODIMENTS

Figure 1:
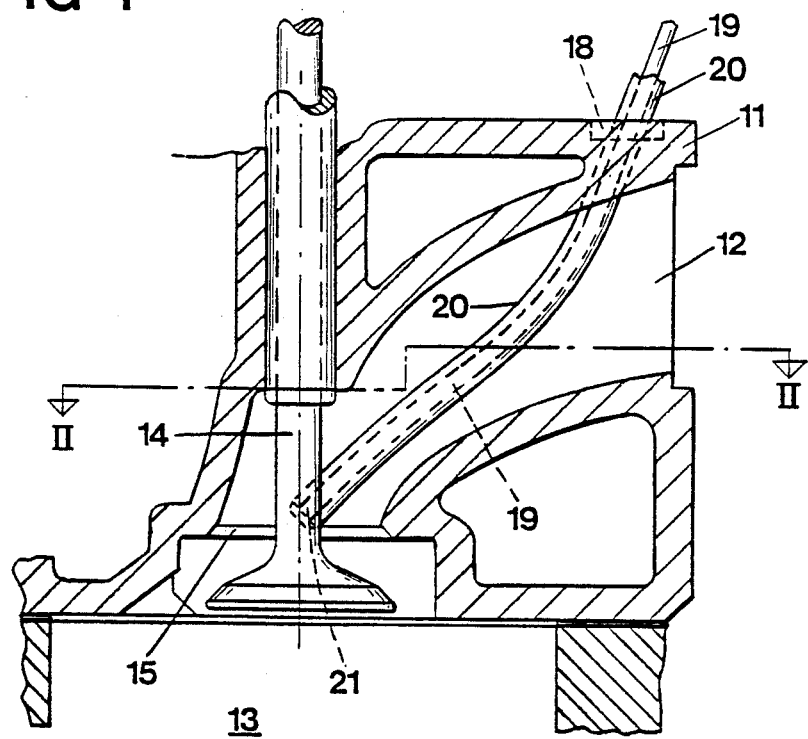
FIG. 1 is a vertical cross-sectional view through a portion of a combustion engine in accordance with the invention.
Figure 2:
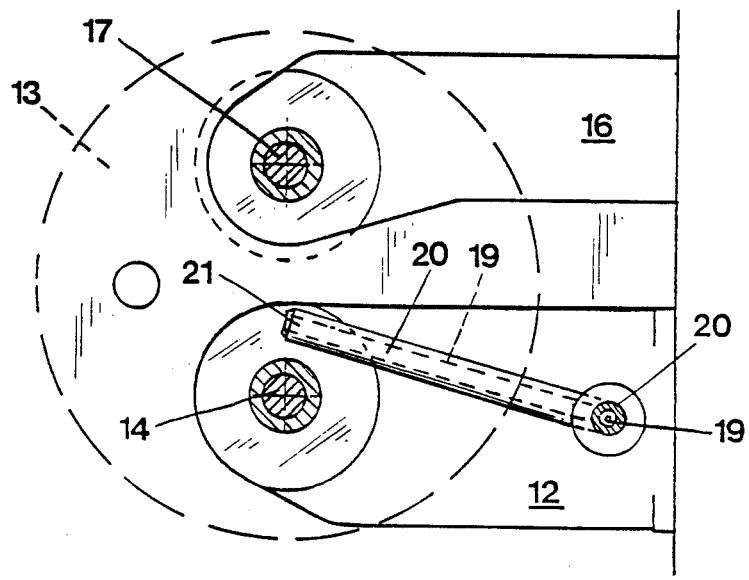
FIG. 2 is a cross-sectional view along the line II—II of FIG. 1.

A portion of an internal combustion engine is illustrated in FIGS. 1 and 2. The engine includes a cylinder head 11, an inlet channel 12, a combustion chamber 13 and an inlet valve 14. The valve 14 cooperates with a valve seat 15. The cylinder head 11 includes an exhaust channel 16 and an outlet valve 17.

A bore 18 is provided in the inlet channel 12. A supply line 19 for supplying a fluid (e.g., water, which, e.g., may be admixed with an antifreeze agent) is introduced into the cylinder head 11 through the bore 18. The supply line 19 is surrounded by and spaced apart from a second supply line 20. The second supply line is adapted to supply a gaseous medium at a pressure which deviates from the pressure prevailing at an orifice 21.

The orifice 21 is preferably situated in close proximity to the inlet valve 14. The orifice 21 can open directly into the combustion chamber 13.

The gaseous medium may be atmosperic air. When the medium is atmospheric air, the line 20 communicates with the atmosphere outside the engine. The medium may also be pressurized engine exhaust gases. The medium can also be a small amount of pressurized air from a turbo charger.

Referring to FIGS. 3–6, one of the lines is preferably provided inside the other such that an annular channel is formed.

Figure 3:
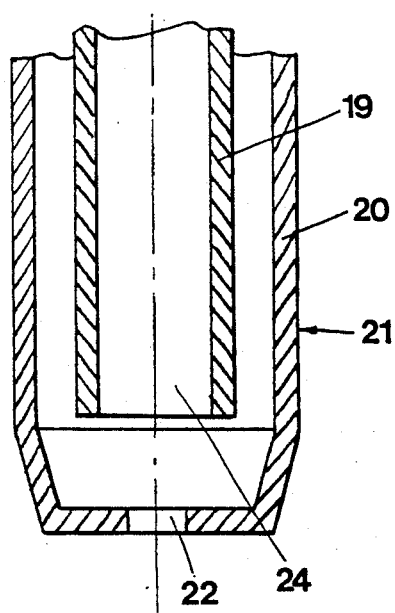
FIGS. 3–6 are enlarged cross-sectional views through different embodiments of an end portion of a supply line in accordance with the invention.
Figure 4:
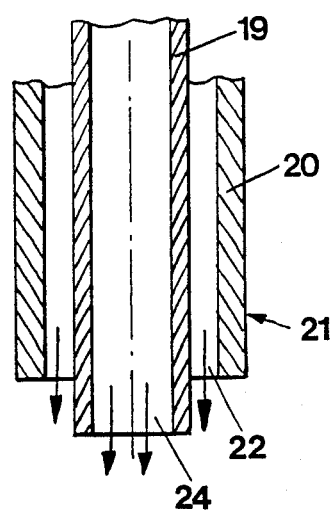

The shape of the mouthpiece is of great importance for the atomization of the fluid in the medium, and for this purpose the mouthpiece may be designed as illustrated in FIG. 3. In the embodiment illustrated in FIG. 3, a common outlet opening 22 has a smaller diameter than an inner opening 24 of the line 19.

For some applications, the fluid or the fluid droplets may be carried along by a passing gas flow. The embodiment illustrated in FIG. 4 may be used in such applications. In the embodiment illustrated in FIG. 4, the orifice 24 is displaced axially from an orifice 22 of the line 20. In the embodiment illustrated in FIG. 4, the orifice 24 is situated outside the orifice 22. Alternatively, the orifice 24 can be inside of the orifice 22.

Figure 5:
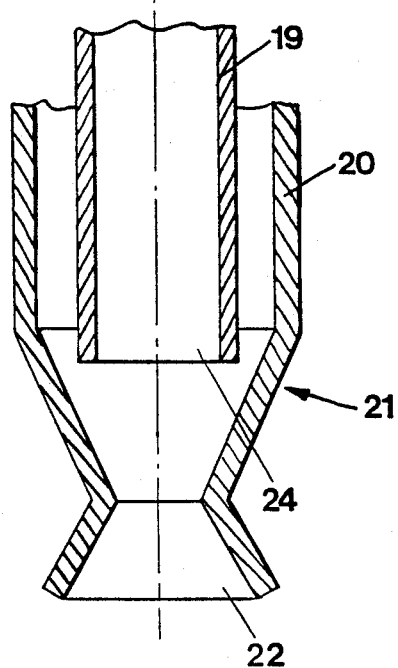
Figure 6:
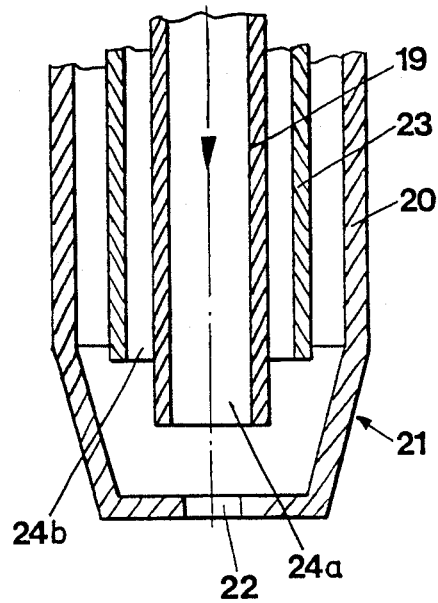

The embodiment illustrated in FIG. 5 is a modification of the embodiment illustrated in FIG. 3. The embodiment illustrated in FIG. 5 has a flanged out opening 22 with a constricted passage. The opening 22 controls dispersion for efficiently admixing the fluid and the medium.

In some applications, it is desirable to add another fuel (e.g., ethanol) to the ordinary fuel. In the embodiment illustrated in FIG. 6, this additional fuel is supplied through a line 23. The line 23 is positioned outside the supply line 19, but inside the medium line 20.

The flow of the fuel is controlled by a dosing device which is far enough away from the combustion chamber 13 so as not to influence the flow control device. Therefore, the demands on the flow control device are reduced. A conventional fuel valve can be disposed of when the pressure at the orifice of the supply line varies less than in the inlet manifold. As the fluid is supplied under almost pressureless conditions and in very small amounts, the fluid is atomized and carried by the gas stream. Thus, the spray pattern can be varied automatically in accordance with the engine load.

The invention is not limited to the embodiments shown. Variations are possible within the scope of the appended claims. For example, more than one supply line may be provided for each cylinder. Thus, a single supply line can be the ordinary fuel line for each cylinder. The location of the supply line can be in any optimal position, even e.g., in an intermediate flange between the engine block and the inlet manifold. The position of the orifice is of great importance such as is shown in Swedish Pat. No. 8106113.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. An internal combustion engine, comprising:
   a combustion chamber with a suction opening;
   an inlet valve for closing the suction opening;
   a fluid supply line with an open end, the open end of the fluid supply line being in close proximity to the suction opening of the combustion chamber;
   a gaseous medium supply line with an open end, the gaseous medium supply line surrounding a portion of the fluid supply line in the vicinity of the open end of the fluid supply line, the open end of the gaseous medium supply line being in close proximity to the open end of the fluid supply line, the open end of the gaseous medium supply line being directed toward the suction opening of the combustion chamber;
   means for supplying a fluid through the fluid supply line in such small quantities that the fluid is in an almost pressure-free condition at the open end of the fluid supply line; and
   gaseous medium supplying means for atomizing the fluid by supplying a gaseous medium through the gaseous medium supply line and past the open end of the fluid supply line at a pressure which is different than the pressure prevailing outside of the open end of the gaseous medium supply line.

2. The engine of claim 1, wherein the gaseous medium supplying means includes means for communicating the gaseous medium supply line with atmospheric air.

3. The engine of claim 1, wherein the gaseous medium supplying means includes an engine exhaust port, the gaseous medium supply line being connected to the exhaust port.

4. The engine of claim 1, wherein the gaseous medium supplying means includes a compressor, the gaseous medium supply line being connected to the compressor.

5. The engine of claim 1, wherein the open end of the gaseous medium supply line is smaller than the open end of the fluid supply line.

6. The engine of claim 1, wherein the open end of the fluid supply line is axially offset from the open end of the gaseous medium supply line.

7. The engine of claim 1, further comprising a second fluid supply line with an open end, the gaseous medium supply line surrounding a portion of the second fluid supply line in the vicinity of the open end of the second fluid supply line, the open end of the gaseous medium supply line being in close proximity to the open end of the second fluid supply line.

* * * * *